United States Patent
Ostermann et al.

(10) Patent No.: US 9,129,378 B2
(45) Date of Patent: Sep. 8, 2015

(54) METHOD AND APPARATUS FOR RECOVERING A COMPONENT OF A DISTORTION FIELD AND FOR DETERMINING A DISPARITY FIELD

(75) Inventors: Ralf Ostermann, Hannover (DE); Dirk Gandolph, Ronnenberg (DE); Joern Jachalsky, Hannover (DE); Markus Schlosser, Hannover (DE)

(73) Assignee: Thomson Licensing, Issy-les-Moulineaux (FR)

( * ) Notice: Subject to any disclaimer, the term of this patent is extended or adjusted under 35 U.S.C. 154(b) by 214 days.

(21) Appl. No.: 13/606,867

(22) Filed: Sep. 7, 2012

(65) Prior Publication Data

US 2013/0058564 A1    Mar. 7, 2013

(30) Foreign Application Priority Data

Sep. 7, 2011    (EP) .................................. 11306111

(51) Int. Cl.
*G06K 9/00*    (2006.01)
*G06T 7/00*    (2006.01)

(52) U.S. Cl.
CPC .................................. *G06T 7/0077* (2013.01)

(58) Field of Classification Search
None
See application file for complete search history.

(56) References Cited

U.S. PATENT DOCUMENTS

| | | | | |
|---|---|---|---|---|
| 5,764,871 A | * | 6/1998 | Fogel | 345/427 |
| 2002/0106120 A1 | * | 8/2002 | Brandenburg et al. | 382/154 |
| 2005/0286758 A1 | * | 12/2005 | Zitnick et al. | 382/154 |
| 2006/0120594 A1 | * | 6/2006 | Kim et al. | 382/154 |
| 2007/0165942 A1 | * | 7/2007 | Jin et al. | 382/154 |
| 2007/0248260 A1 | * | 10/2007 | Pockett | 382/154 |
| 2010/0027874 A1 | * | 2/2010 | Jeong et al. | 382/154 |
| 2010/0053416 A1 | | 3/2010 | Chen et al. | |
| 2010/0208034 A1 | * | 8/2010 | Chen | 348/46 |
| 2011/0044531 A1 | * | 2/2011 | Zhang et al. | 382/154 |

(Continued)

FOREIGN PATENT DOCUMENTS

| | | |
|---|---|---|
| JP | 2009139995 | 6/2009 |
| KR | 20050024915 | 3/2005 |
| WO | WO2004088245 | 10/2004 |

OTHER PUBLICATIONS

Jachalsky, Jorn, Markus Schlosser, and Dirk Gandolph. "Confidence evaluation for robust, fast-converging disparity map refinement." Multimedia and Expo (ICME), 2010 IEEE International Conference on. IEEE, 2010.*

(Continued)

*Primary Examiner* — Stephen R Koziol
*Assistant Examiner* — Sean Conner
(74) *Attorney, Agent, or Firm* — Myers Wolin LLC

(57) ABSTRACT

A method and an apparatus for recovering a component of a distortion field of an image of a set of multi-view images are described. Also described are a method and an apparatus for determining a disparity field of an image of a set of multi-view images, which makes use of such method.
In a first step pixel correspondences between the image and another image of the set of multi-view images are determined. A disparity field is then determined from at least a subset of the determined pixel correspondences. The disparity field is smoothed and the component of the distortion field is estimated from the smoothed disparity field. When determining a second disparity field the estimated component of the distortion field is taken into account when determining pixel correspondences between the image and another image of the set of multi-view images.

24 Claims, 3 Drawing Sheets

(56) References Cited

U.S. PATENT DOCUMENTS

| | | | |
|---|---|---|---|
| 2011/0044557 | A1 | 2/2011 | Abraham et al. |
| 2011/0110583 | A1* | 5/2011 | Zhang et al. ............... 382/154 |
| 2011/0211750 | A1* | 9/2011 | Thorpe et al. ............... 382/154 |
| 2011/0249889 | A1* | 10/2011 | Kothandaraman et al. ... 382/154 |
| 2014/0240310 | A1* | 8/2014 | Guseva ........................ 345/419 |

OTHER PUBLICATIONS

Huang, T., G. Yang, and G. Tang. "A fast two-dimensional median filtering algorithm." Acoustics, Speech and Signal Processing, IEEE Transactions on 27.1 (1979): 13-18.*

Atzpadin, Nicole, Peter Kauff, and Oliver Schreer. "Stereo analysis by hybrid recursive matching for real-time immersive video conferencing." Circuits and Systems for Video Technology, IEEE Transactions on 14.3 (2004): 321-334.*

Zilly, Frederik, et al. "The Stereoscopic Analyzer-An image-based assistance tool for stereo shooting and 3D production." Image Processing (ICIP), 2010 17th IEEE International Conference on. IEEE, 2010.*

Heinzle, Simon, et al. "Computational stereo camera system with programmable control loop." ACM Transactions on Graphics (TOG). vol. 30. No. 4. ACM, 2011.*

Lee, Eun-Kyung, and Yo-Sung Ho. "Generation of multi-view video using a fusion camera system for 3D displays." Consumer Electronics, IEEE Transactions on 56.4 (2010): 2797-2805.*

Kooi, Frank L., and Alexander Toet. "Visual comfort of binocular and 3D displays." Displays 25.2 (2004): 99-108.*

Zuo, Yi-Fan, et al. "Fast segment-based algorithm for multi-view depth map generation." Intelligent Computing Theories and Applications. Springer Berlin Heidelberg, 2012. 553-560.*

Tomasi, Carlo, and Roberto Manduchi. "Bilateral filtering for gray and color images." Computer Vision, 1998. Sixth International Conference on. IEEE, 1998.*

Scarano, F., et al. "S-PIV comparative assessment: image dewarping+ misalignment correction and pinhole+ geometric back projection." Experiments in fluids 39.2 (2005): 257-266.*

Garding, J., et al. "Stereopsis, vertical disparity and relief transformations." Vision research 35.5 (1995): 703-722.*

Birchfield, Stan, and Carlo Tomasi. "Depth discontinuities by pixel-to-pixel stereo." International Journal of Computer Vision 35.3 (1999): 269-293.*

Brown, Myron Z., Darius Burschka, and Gregory D. Hager. "Advances in computational stereo." Pattern Analysis and Machine Intelligence, IEEE Transactions on 25.8 (2003): 993-1008.*

Leung, Carlos, Ben Appleton, and Changming Sun. "Fast stereo matching by iterated dynamic programming and quadtree subregioning." British Machine Vision Conference. vol. 1. The British Machine Vision Association, 2004.*

A.Fusiello et al.: "A compact algorithm for rectification of stereo pairs", Mach. Vis. Appl. vol. 12 (2000), pp. 16OE22

H. Hirschmüller et al.: "Stereo Matching in the Presence of Sub-Pixel Calibration Errors", IEEE Conf. .Comp. Vis. Patt. Recog. (2009), pp. 437 444.

M. Pollefeys et al.: Some Geometric Insight in Self-Calibration and Critical-Motion-Sequencesft, Technical Report Nr. KUL/ESAT/PSI/0001, Katholieke Universiteit Leuven, 2000.

Cai et al., "Multi-view distributed video coding using epipolar geometry", Computer Engineering and Applications, vol. 46, No. 17, Jun. 2010, pp. 121-124. English Abstract.

Yoda et al., "Utilization of stereo disparity and optical flow information for human interaction", Sixth International Conference on Computer Vision, Jan. 4, 1998, pp. 1109-1114.

* cited by examiner

METHOD AND APPARATUS FOR RECOVERING A COMPONENT OF A DISTORTION FIELD AND FOR DETERMINING A DISPARITY FIELD

This application claims the benefit, under 35 U.S.C. §119 of EP Patent Application 11306111.3, filed 7 Sep. 2011.

FIELD OF THE INVENTION

The invention relates to a method and an apparatus for recovering a component of a distortion field of an image of a set of multi-view images, as well as to a method and an apparatus for determining a disparity field of an image of a set of multi-view images, which makes use of such method.

BACKGROUND OF THE INVENTION

Vertical misalignments occurring in multi-view or stereo images are mainly caused by improperly adjusted cameras and/or by lens distortions. This can happen when the optical axes of the cameras are not exactly parallel, the image sensors are not exactly coplanar, or the lens characteristics deviate from an ideal pin-hole camera.

When working in a very controlled environment, these errors can be avoided by calibrating the camera setup. The simplest solution is based on placing calibration patterns in front of the cameras and by applying an algorithm to determine the intrinsic and extrinsic camera parameters as well as the lens distortion parameters. Knowing all these parameters, it is possible to compensate improperly adjusted cameras and lens distortions by a process called rectification. A description of such a rectification process is given is A. Fusiello et al.: "*A compact algorithm for rectification of stereo pairs*", Mach. Vis. Appl. Vol. 12 (2000), pp. 16-22.

When something is changed about the camera setup, e.g. when the zoom or even just the focus is changed by the camera operator, or when a non-rigid camera setup is moved from one place to another, the calibration parameters will become invalid. As a consequence it is almost impossible to apply a correct compensation by means of pre-determined camera calibration parameters when shooting real-life footage.

As a further complication, exact rectification is only possible for stereo image pairs. For multi-view images, exact rectification is restricted to objects located on a given plane floating in 3D space in front of the cameras. Although the location of the plane can be chosen freely, objects not located on the given plane can only be approximately rectified.

Research has been done to find methods for estimating camera parameters and lens parameters on-the-fly during shooting.

These approaches are typically based on feature point trackers. It is intuitively clear that it is not always possible to distinguish motion of objects in front of the camera from camera motion or lens modifications. See, for example, M. Pollefeys et al.: "*Some Geometric Insight in Self-Calibration and Critical-Motion-Sequences*", Technical Report Nr. KUL/ESAT/PSI/0001, Katholieke Universiteit Leuven, 2000.

Vertical misalignments are a serious problem in stereo or multi-view content. They can be corrected by the brain to some extent, but watching misaligned content over an extended period of time can cause fatigue, eye strain or even nausea. It has thus to be ensured that vertical misaligned content is not delivered to the consumer. Estimating the amount of vertical misalignment should, therefore, be part of the analysis being done when offering a 3D certification service.

Apart from the above issues, vertical misalignments also cause difficulties for disparity estimators. See, for example, H. Hirschmüller et al.: "*Stereo Matching in the Presence of Sub-Pixel Calibration Errors*", IEEE Conf. .Comp. Vis. Patt. Recog. (2009), pp. 437-444. Disparity estimators typically rely on the epipolar constraint, which on one hand reduces the disparity search space (leading to lower computational complexity), but on the other hand also constrains the solutions to those that are geometrically sound. The epipolar constraint is typically incorporated by restricting the disparity search to a search along horizontal scan lines, assuming that the horizontal scan lines coincide with the epipolar lines. Any vertical misalignment will cause the epipolar lines to deviate from the horizontal scan lines. As a consequence, searching along horizontal lines will cause wrong disparity estimation results.

Except for live broadcast scenarios, problems caused by improperly positioned cameras or by lens distortions can be corrected in post-production. However, in practice it is often necessary to deal with content before it is being corrected.

Consequently, there is a need for disparity estimation methods that are robust with respect to vertical misalignments, camera miscalibrations and/or lens distortions. There is also a need for a method to determine the amount of misalignments or distortion, especially a vertical component of a distortion field.

SUMMARY OF THE INVENTION

It is thus an object of the invention to propose a solution for recovering a component of a distortion field of an image of a set of multi-view images. It is a further object of the invention to propose a solution for determining a disparity field of an image of a set of multi-view images, which makes use of the recovered component of the distortion field.

According to a one aspect of the invention, a method for recovering a component of a distortion field of an image of a set of multi-view images comprises the steps of:
  determining pixel correspondences between the image and another image of the set of multi-view images;
  determining a disparity field from at least a subset of the determined pixel correspondences;
  smoothing the disparity field; and
  estimating the component of the distortion field from the smoothed disparity field.

The proposed method allows to use an already available disparity estimator framework for estimating a component of a distortion field caused by misalignments, e.g. a vertical component of a distortion field. This avoids the overhead of a separate self-calibration framework, i.e. no feature tracker is needed in addition to the disparity estimator. The method makes use of the observation that a distortion field will vary very smoothly over large parts of the images of the set of multi-view images, e.g. the images of a stereoscopic image pair. This smooth variation allows to apply a smoothing filter to recover the desired component of the underlying distortion field from a noisy disparity field estimate. Generally the disparity field is a set of image coordinates or a set of coordinates derived from the image coordinates. Smoothing is then applied to one component of the image coordinates, preferably the vertical component, or to one component of the coordinates derived from the image coordinates.

Favorably, smoothing is performed with a median filter or with a low-pass filter. Preferably, the median filter is implemented by creating a sliding histogram of the one component of the image coordinates or the one component of the coordinates derived from the image coordinates. Employing these filters greatly reduces the complexity of calculating the filter kernel.

Advantageously, an apparatus for recovering a component of a distortion field of an image of a set of multi-view images is adapted to perform the method steps described above for recovering the component of the distortion field.

According to another aspect of the invention, a method for determining a disparity field of an image of a set of multi-view images comprises the steps of:
  determining pixel correspondences between the image and another image of the set of multi-view images;
  determining a first disparity field from at least a subset of the determined pixel correspondences;
  smoothing the first disparity field;
  estimating a component of a distortion field from the smoothed first disparity field; and
  determining a second disparity field, wherein the estimated component of the distortion field is taken into account when determining pixel correspondences between the image and another image of the set of multi-view images.

The recovered component of the distortion field is taken into account when a further disparity field is determined, e.g. by keeping the estimated component of the distortion field fixed during subsequent passes of a multi-pass disparity estimator or during subsequent meander scans of a hybrid recursive matcher. In other words, in case of a multi-pass disparity estimator the first disparity field is determined in an earlier pass and the second disparity field is determined in a later pass. Likewise, in case of a hybrid recursive matcher the first disparity field is determined in an earlier meander scan and the second disparity field is determined in a later meander scan.

Advantageously, an apparatus for determining a disparity field of an image of a set of multi-view images is adapted to perform the method steps described above for determining the disparity field.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims. In the figures:

DETAILED DESCRIPTION OF PREFERRED EMBODIMENTS

Figure 1:
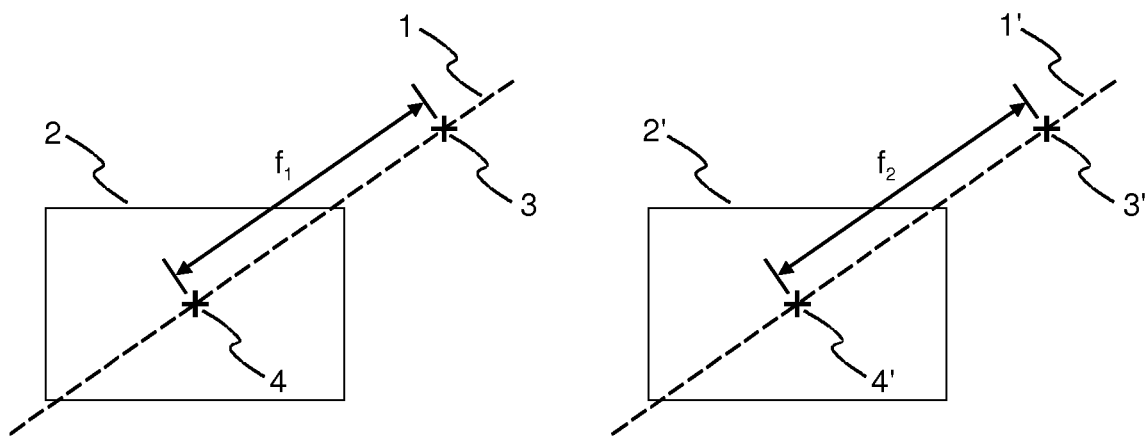
FIG. 1 shows a camera setup consisting of two cameras.

FIG. 1 shows a camera setup consisting of two cameras. The figure assumes a pin-hole camera model. Each camera has an optical axis 1, 1' and an image plane 2, 2'. In a distance from the image planes 2, 2' corresponding to the focal lengths $f_1$, $f_2$ are the respective optical centers 3, 3'. Finally, located at the intersections of the optical axes 1, 1' with the respective image planes 2, 2' are the principle points 4, 4' of the two cameras. Ideally, the optical axes 1, 1' of the cameras are parallel and the image planes 2, 2' are coplanar.

In practice camera setups are not as perfect as shown in FIG. 1. Improperly adjusted cameras and/or lens distortions can be classified into a number of main error sources:
  Camera poses where the optical axes 1, 1' of the cameras are not exactly parallel;
  Camera poses that are rotated around their optical axis 1, 1';
  Camera poses where the image sensors (and hence the image planes 2, 2') are not coplanar;
  Cameras where the optical axes 1, 1' pass through different pixel positions of the image sensors;
  Cameras where the x-axes of the image planes 2, 2' are not parallel to the line connecting both principal points 3, 3';
  Different focal lengths $f_1$, $f_2$ of the camera lenses; and
  Barrel or pin-cushion lens distortions.

Rectification tries to compensate for these errors by applying a 2-dimensional displacement vector field to the images. This individually moves each pixel to a new position where it is supposed to be in an ideal, error free camera setup. The displacement vector field is designed to exactly undo the effects of the 2-dimensional distortion field caused by the error sources listed above.

For further explanation two examples of distortion fields shall be given in the following. For simplicity, for each example only a single camera setup error is assumed.

Figure 2:
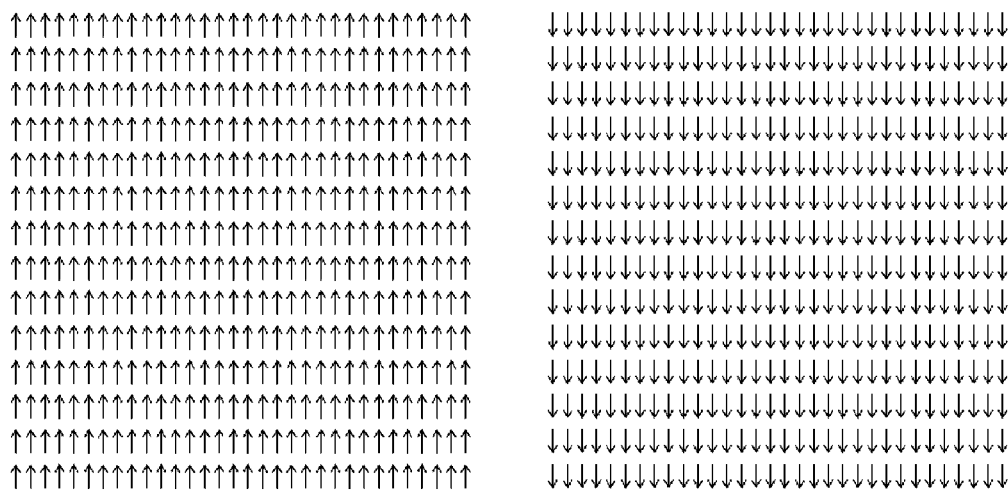
FIG. 2 depicts a first example of displacement vector fields.

In the first example the cameras are rotated around the x-axis relative to each other, i.e. tilt is present, such that the optical axes 1, 1' of both cameras are not parallel anymore. The x-axis is assumed to coincide with a line passing through both optical centers 3, 3'. In this case one of the cameras can be arbitrarily chosen as the reference camera, i.e. defining the coordinate system. The z-axis is then given by the optical axis 1, 1' of the reference camera. The displacement vector field for the reference camera consists of vectors with zero length, and the displacement vector field for the other camera consists of vertical vectors of approximately equal length. The opposite result would be obtained by choosing the coordinate system such that the z-axis coincides with the optical axis 1, 1' of the other camera. Alternatively the z-axis can be chosen such that it is essentially in the middle between both optical axes 1, 1'. This would result in the two displacement vector fields depicted in FIG. 2.

Figure 3:
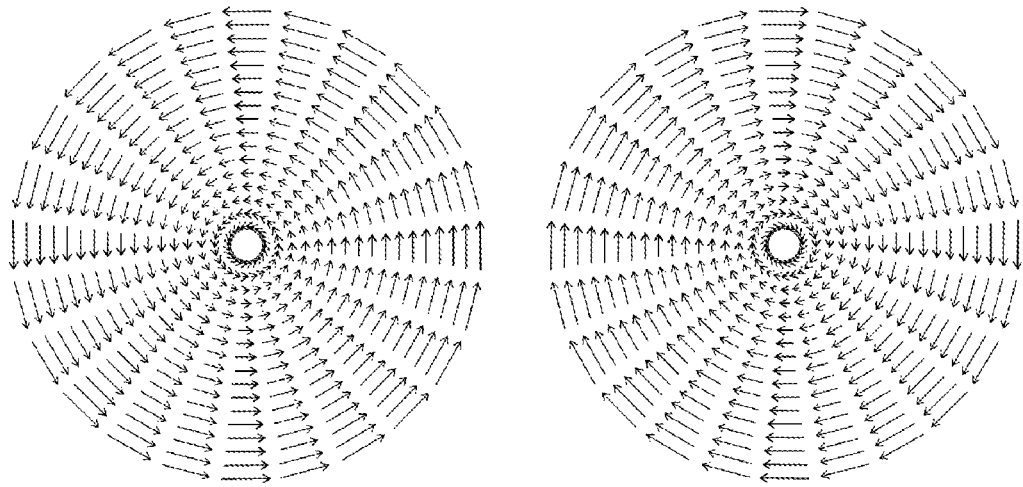
FIG. 3 shows a second example of displacement vector fields.

In the second example the cameras are rotated around their optical axes 1, 1' relative to each other, i.e. roll is present, such that the x-axes of the image planes 2, 2' are not parallel to the line connecting both principal points 4, 4' anymore. In this case both cameras need to be rotated back, resulting in the two displacement vector fields depicted in FIG. 3.

A standard disparity estimator can be modified to estimate horizontal and vertical disparities simultaneously. However, an unmindful implementation of this approach will inevitably result in severe estimation errors. Especially when diagonal structures are present in the images, searching in vertical direction may result in better matches than searching in horizontal direction, even when this does not make any sense from a geometrical perspective. In addition, adding another degree of freedom, namely a second dimension, will increase the amount of mismatches. This is because the epipolar constraint is neglected using an unmindful implementation. To solve this problem a solution is necessary that allows to keep the benefits of the epipolar constraint while enabling a search in vertical direction.

Figure 4:
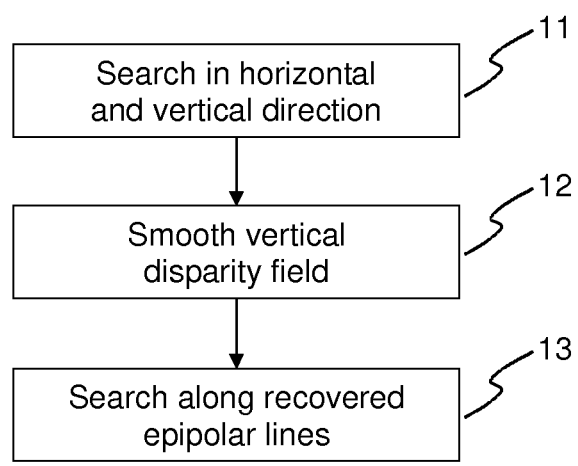
FIG. 4 shows a flowchart of a method according to the invention.

The solution according to the present invention is illustrated in FIG. 4. The method starts with a search 10 in both horizontal and vertical direction. Afterwards the resulting vertical disparity field is strongly smoothed 11. The extent of the filter kernel is chosen big enough to remove estimation errors caused by diagonal image structures.

An analysis of the list of error sources mentioned above shows that all of them result in distortion fields that vary very smoothly over large parts of the images. Therefore, a strong smoothing filter allows to reduce the noise level and to recover the vertical component of the distortion field. Phrased differently, the smoothing operation will estimate the vertical component of the distortion field from the noisy vertical disparity field.

The extent of the filter kernel has to be rather large for a very strong smoothing filter, covering at least a 2-digit percentage of the image sizes. As this may easily become a performance bottleneck, a separable median filter is preferably used. Alternatively, a low-pass filter with a rectangular kernel is employed.

A separable filter reduces the complexity of calculating the filter kernel from $O(n^2)$ to $O(n)$, as instead of applying a 2-dimensional filter kernel, a 1-dimensional horizontal filter kernel followed by a 1-dimensional vertical filter kernel (or vice-versa) is applied. As the estimated vertical disparities assume only a limited number of discrete values, a median filter can efficiently be implemented by creating a sliding histogram of the pixels, thereby reducing the complexity of calculating the filter kernel from $O(n)$ to $O(1)$. Using a histogram for efficient median filtering is described, for example, in T. Huang et al.: "*A Fast Two-Dimensional Median Filtering Algorithm*", IEEE Trans. Acoust., Speech, Signal Process. Vol. 27 (1979), pp. 13-18.

Once the vertical component of the distortion field has been recovered, it is used in a second pass 13 of the disparity estimator. During this pass, the vertical distortions are imposed upon the disparity search, i.e. forcing the disparity search to deviate from a purely horizontal search along the scan lines to a search along the recovered epipolar lines.

The described method only recovers the vertical component of the distortion field, i.e. the vertical misalignment. As long as the epipolar lines stay approximately horizontal, the inevitable superposition of the vertical component of the distortion field and the vertical disparities can be ignored. This assumption is generally justified for content that is meant for consumption by human eyes. But this assumption also highlights the fact that it is very difficult and error prone to recover the horizontal component of the distortion field, as there is almost always a superposition of the horizontal component of the distortion field and the (mostly) horizontal disparities.

In any case, recovering the vertical component alone is often sufficient in practice, for instance if the goal is to determine the presence of any vertical misalignment, e.g. during image analysis for 3D certification. As already stated before, vertical misalignments are difficult to tolerate for human observers, whereas horizontal distortions are merely causing an acceptable depth misperception.

In the following the integration of the vertical disparity field estimation into a disparity estimator with minimum overhead shall be discussed.

As described above, the vertical disparity field adds a pre-processing pass to the disparity estimator. Having a separate pre-processing pass can be avoided if the disparity estimator uses some sort of multi-pass scheme anyway. One example is a hybrid recursive matching estimator as described, for example, in N. Atzpadin et al.: "*Stereo analysis by hybrid recursive matching for real-time immersive video conferencing*", IEEE Trans. Circ. Syst. Video Tech. Vol. 14 (2004), pp. 321-334. In case of the hybrid recursive matching, the search in both vertical and horizontal direction is done during the first meander scan. After smoothing the vertical disparity field is enforced upon subsequent meander scans by keeping the vertical component fixed.

Figure 5:
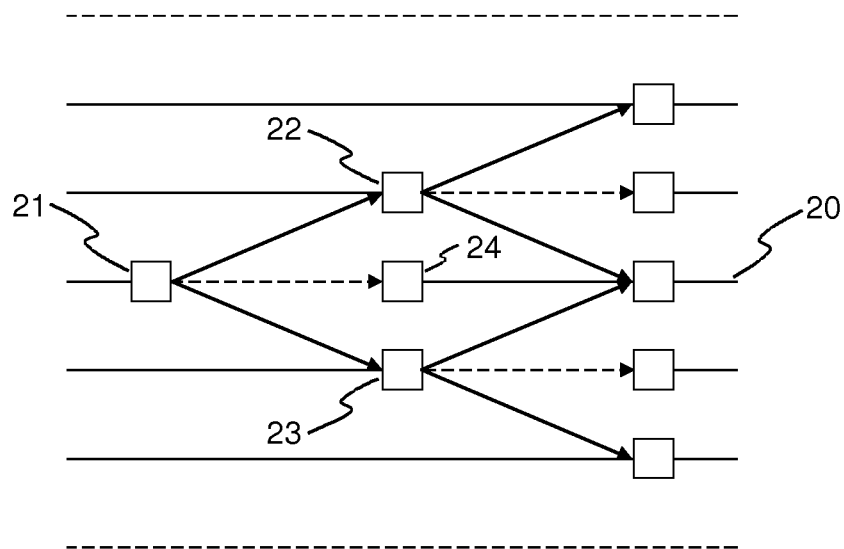
FIG. 5 depicts an efficient vertical disparity search using a hybrid recursive matching estimator.

The hybrid recursive matching allows for another performance enhancement, as there is no need for a full search vertical disparity search. The principle of checking spatial and temporal candidates, which is used by the hybrid recursive matching, allows to test just two additional vertical disparity candidates 22, 23, one above and one below the current best candidate 24 for the current pixel position 21. This is illustrated in FIG. 5, where the solid arrows designate the additional candidates, whereas the dashed arrows designate the candidates that would have been tested anyway by the hybrid recursive matching. During meander scan, these checks are repeated for the next pixel locations, resulting in a sort of gradient search distributed over consecutive pixel locations.

Thus, even though just the two scan lines directly above and below the current scan line 20 are checked, after a few pixels the hybrid recursive matching can find arbitrary large vertical disparities. Another benefit of limiting the incremental search step to ±1 is that this will bias disparity search results to prefer horizontal disparities over vertical disparities. Furthermore, the searchable vertical disparity range is restricted to stay within some pre-defined limit. Given this and the fact that the vertical search is only done during the first meander scan, results in a very low overhead implementation.

Another example is a hierarchical disparity estimator, which starts with a low-resolution version of the images and works its way up to the full-resolution images. In such a case one of the lower resolution estimator passes can search in both vertical and horizontal direction. After smoothing the vertical disparity field is enforced upon the higher resolution estimator passes by keeping the vertical disparity component fixed, while estimating and improving the horizontal disparity field. For this example advantageously a rectangular low-pass filter is used, because such a filter automatically creates the sub-pixel accurate estimates of the vertical component of the distortion field that are needed for the higher resolution disparity estimation passes.

What is claimed is:

1. A method for determining a disparity field of an image of a set of multi-view images, the method comprising:
    determining pixel correspondences between the image and another image of the set of multi-view images with a multi-pass disparity estimator;
    determining a vertical disparity field from at least a subset of the determined pixel correspondences in an earlier pass of the multi-pass disparity estimator;
    smoothing the vertical disparity field;
    estimating a vertical component of a distortion field from the smoothed vertical disparity field; and
    determining a horizontal disparity field in a later pass of the multi-pass disparity estimator, wherein the estimated vertical component of the distortion field is taken into account when determining pixel correspondences between the image and another image of the set of multi-view images by keeping the estimated vertical component of the distortion field fixed during subsequent passes of the multi-pass disparity estimator.

2. An apparatus for determining a disparity field of an image of a set of multi-view images, the apparatus comprising:
    a multi-pass disparity estimator configured to determine pixel correspondences between the image and another image of the set of multi-view images, to determine a vertical disparity field from at least a subset of the determined pixel correspondences in an earlier disparity estimation pass, and to determine a horizontal disparity field in a later disparity estimation pass; and a smoothing filter configured to smooth the vertical disparity field;

wherein the multi-pass disparity estimator is further configured to estimate a vertical component of a distortion field from the smoothed vertical disparity field and to take the estimated vertical component of the distortion field into account when determining pixel correspondences between the image and another image of the set of multi-view images by keeping the estimated vertical component of the distortion field fixed during subsequent disparity estimation passes.

3. The method according to claim 1, wherein the set of multi-view images is a stereoscopic image pair.

4. The method according to claim 1, wherein the disparity field is a set of image coordinates or a set of coordinates derived from image coordinates, and the smoothing is applied to a vertical component of the set of image coordinates or to a vertical component of the set of coordinates derived from the image coordinates.

5. The method according to claim 1, wherein the smoothing is performed with a median filter or with a low-pass filter.

6. The method according to claim 5, wherein the median filter is implemented by creating a sliding histogram of a vertical component of a set of image coordinates or a vertical component of a set of coordinates derived from image coordinates.

7. The method according to claim 1, wherein the smoothing is performed with a filter having a large filter kernel.

8. A method for determining a disparity field of an image of a set of multi-view images, the method comprising:
   determining pixel correspondences between the image and another image of the set of multi-view images with a hybrid recursive matcher;
   determining a vertical disparity field from at least a subset of the determined pixel correspondences in an earlier meander scan of the hybrid recursive matcher;
   smoothing the vertical disparity field;
   estimating a vertical component of a distortion field from the smoothed vertical disparity field; and
   determining a horizontal disparity field in a later meander scan of the hybrid recursive matcher, wherein the estimated vertical component of the distortion field is taken into account when determining pixel correspondences between the image and another image of the set of multi-view images by keeping the estimated vertical component of the distortion field fixed during subsequent meander scans.

9. The method according to claim 8, wherein the set of multi-view images is a stereoscopic image pair.

10. The method according to claim 8, wherein the disparity field is a set of image coordinates or a set of coordinates derived from image coordinates, and the smoothing is applied to a vertical component of the set of image coordinates or to a vertical component of the set of coordinates derived from the image coordinates.

11. The method according to claim 8, wherein the smoothing is performed with a median filter or with a low-pass filter.

12. The method according to claim 11, wherein the median filter is implemented by creating a sliding histogram of a vertical component of a set of image coordinates or a vertical component of a set of coordinates derived from image coordinates.

13. The method according to claim 8, wherein the smoothing is performed with a filter having a large filter kernel.

14. The apparatus according to claim 2, wherein the set of multi-view images is a stereoscopic image pair.

15. The apparatus according to claim 2, wherein the disparity field is a set of image coordinates or a set of coordinates derived from image coordinates, and the smoothing filter is configured to smooth the vertical component of the image coordinates or to the vertical component of the coordinates derived from the image coordinates.

16. The apparatus according to claim 2, wherein the smoothing filter is a median filter or a low-pass filter.

17. The apparatus according to claim 16, wherein the median filter is implemented by creating a sliding histogram of a vertical component of a set of image coordinates or a vertical component of a set of coordinates derived from image coordinates.

18. The apparatus according to claim 2, wherein the smoothing filter has a large filter kernel.

19. An apparatus for determining a disparity field of an image of a set of multi-view images, the apparatus comprising:
   a hybrid recursive matcher configured to determine pixel correspondences between the image and another image of the set of multi-view images, to determine a vertical disparity field from at least a subset of the determined pixel correspondences in an earlier meander scan, and to determine a horizontal disparity field in a later meander scan; and
   a smoothing filter configured to smooth the vertical disparity field;
   wherein the hybrid recursive matcher is further configured to estimate a vertical component of a distortion field from the smoothed vertical disparity field and to take the estimated vertical component of the distortion field into account when determining pixel correspondences between the image and another image of the set of multi-view images by keeping the estimated vertical component of the distortion field fixed during subsequent meander scans.

20. The apparatus according to claim 19, wherein the set of multi-view images is a stereoscopic image pair.

21. The apparatus according to claim 19, wherein the disparity field is a set of image coordinates or a set of coordinates derived from image coordinates, and the smoothing filter is configured to smooth the vertical component of the image coordinates or to the vertical component of the coordinates derived from the image coordinates.

22. The apparatus according to claim 19, wherein the smoothing filter is a median filter or a low-pass filter.

23. The apparatus according to claim 22, wherein the median filter is implemented by creating a sliding histogram of a vertical component of a set of image coordinates or a vertical component of a set of coordinates derived from image coordinates.

24. The apparatus according to claim 19, wherein the smoothing filter has a large filter kernel.

* * * * *